Patented Nov. 28, 1950

2,531,427

UNITED STATES PATENT OFFICE 2,531,427

MODIFIED GEL-FORMING CLAY AND PROCESS OF PRODUCING SAME

Ernst A. Hauser, Cambridge, Mass.

No Drawing. Application May 3, 1946,
Serial No. 667,119

16 Claims. (Cl. 260—448)

This invention relates to a modified gel-forming clay and a process of making the same. The gel-forming clay is one which is dispersible in an organic liquid to form a gel therein, as distinguished from a clay which is dispersible in water to form a gel therein.

Although certain colloidal clays, chiefly bentonites, when placed in water will swell to many times their dry volumes and in so doing will form gels or pastes of high consistency useful either without further treatment or in mixture with other materials to form in some cases emulsions, gels embodying this invention may be obtained in liquids other than water. The aforementioned gels of bentonite in water are subject to drying, shrinking, and cracking by reason of evaporation of the liquid phase, and similarly, emulsions of organic liquids or solids in aqueous bentonite gels exhibit this same defect upon being exposed to the atmosphere for any appreciable length of time. The effectiveness of such preparations is therefore limited.

It has been known that a clay such as montmorillonite, originally exhibiting a substantial base-exchange capacity, can be reacted with an organic compound such as an amine so that the clay cation will be replaced by a substituted cation of the organic compound in order to form a water-repellent product. However, such products as heretofore proposed had no substantial gel-forming characteristic in an organic liquid and they were substantially non-swelling. Thus, the reaction products of propyl, butyl, and octyl amines, containing from 3 to 8 carbon atoms, with sodium bentonite swell only from 5 ml. to 7 ml., when 2 grams of the product are dispersed in an excess, for example, 100 milliliters of nitrobenzene. Such products are, therefore, applicable only where a compound having no exceptionally high gelling properties in an organic liquid is needed.

One of the objects of this invention, therefore, is to provide a modified clay product and a process of producing the same, which product forms a gel in an organic liquid and has a substantial gel characteristic therein; that is, it will swell to a substantial extent when dispersed in an organic liquid, such as nitrobenzene.

Further objects will appear in further description in which will be set forth a number of embodiments of this invention; it is to be understood, however, that this invention is susceptible of various embodiments, within the scope of the appended claims, without departing from the spirit of this invention.

Generally stated and in accordance with the illustrative embodiments of this invention, a cation modified clay product is produced which has an organic radical, forms a gel in an organic liquid to which the organic radical of the modified clay has an affinity, and has a substantial gel characteristic therein, viz., 2 grams of which modified clay swell to at least 20 ml. in an excess, for example, 100 milliliters of the liquid, such as nitrobenzene, that is, ten-fold.

The clays which are useful as starting materials in accordance with this invention are those exhibiting substantial base-exchange properties, and particularly those exhibiting comparatively high base-exchange properties and containing cations capable of more or less easy replacement. The clays particularly contemplated by the specification and the claims, include the montmorillonites, viz., sodium, potassium, lithium, and other bentonites, viz. Wyoming bentonite, magnesium bentonite (sometimes called hectorite) and saponite; also nontronite, attapulgite, illite, zeolites, and fuller's earths, particularly those of the Georgia-Florida type. These clays, characterized by an unbalanced atomic structure or unbalanced crystal lattice, are believed to have negative charges which are normally neutralized by inorganic cations. As found in nature, therefore, they exist as salts of the weak clay-acid with bases such as the alkali- or alkaline-earth metal hydroxides.

The base-exchange capacities of the various clays enumerated run from about 15 to about 100, based upon milliequivalents of exchangeable base per 100 grams of clay. The montmorillonites have comparatively high base-exchange capacities, viz., 60–100. Attapulgite and illite have substantial base-exchange capacities, viz., 25–35 and 15–40, respectively. Generally, the clays of higher base-exchange capacities i. e., of at least 25 are particularly useful where high exchange of an organic base for the cation of the clay is desired.

More specifically, and in accordance with illustrative embodiments of this invention, a clay of the character described and exhibiting substantial base-exchange capacity, is reacted with an organic compound, more particularly one hereinafter generally defined and referred to as an "onium" compound, by substitution of the clay cation of the organic compound, which cation is of a class hereinafter referred to as an "onium" base. This invention is not, however, restricted to the use of a reaction product of a base-salt with clay-salt, but includes the reaction product of a free base with an acid-clay.

An "onium" compound has been defined in Hackh's Chemical Dictionary, Second Edition, as A group of organic compounds of the type $RXH_y$ which are isologs of ammonium and contain the element X in its highest positive valency, viz:

Where X is pentavalent as in ammonium, phosphonium, arsonium, and stibonium; where X is tetravalent as in oxonium, sulfonium, selenonium and stannonium compounds; and where X is trivalent, as in iodonium compounds; and that they may be considered addition compounds of oxonium, carbonium, stibonium, c. f., -inium, -ylium.

A number of the compounds capable of reacting with clays, particularly bentonite, will be described; it is to be understood, however, that various other compounds reactable with clays of the character described, may be employed. These compounds may include salts of aliphatic, cyclic, aromatic, and heterocyclic amines, primary, secondary, and tertiary amines and polyamines, also quaternary ammonium compounds, as well as other monovalent or polyvalent onium compounds, such as triphenylalkyl phosphonium-asonium-stibonium-halides, or dialkyl-, or aryl-sulphonium and selenonium halides and pyrones, such as 2,5-dialkyl gamma pyrone hydrochloride.

As previously mentioned, the untreated sodium bentonite in contact with water absorbs large quantities of the water and swells, forming a gel. This swelling has been attributed to the lamellar structure of the clay mineral and to adsorption of water molecules onto the surfaces of the mineral sheets, thus giving rise to a separation of the sheets as the oriented water layers build up to an appreciable depth. If the surfaces of the clay laminae contain organic matter, as by the reaction of base exchange with an organic base, the ability of water molecules to be adsorbed is eliminated, and the clay no longer exhibits its former swelling capacity in water. Thus Wyoming bentonite, for example, which is essentially the sodium salt of montmorillonitic acid, is capable of reacting with organic bases or their salts, e. g., 1. $Na^+$ bentonite$^-$ + $C_{12}H_{25}NH_2$ $\xrightarrow{H+OH^-}$ $C_{12}H_{25}NH_3^+$ bentonite$^-$ + $Na^+OH^-$, or more readily 2. $Na^+$ bentonite$^-$ + $C_{12}H_{25}NH_3^+Cl^-$ $\longrightarrow$ $C_{12}H_{25}NH_3^+$ bentonite$^-$ + $Na^+Cl^-$ The resulting dodecylammonium bentonite is visualized as consisting of clay mineral laminae with dodecylammonium groups fairly regularly distributed over the surfaces and attached by means of the substituted ammonium groups, with the hydrocarbon tails extending out over the crystal surfaces. Such a material is now organophilic rather than hydrophilic and as such exhibits in organic liquids some of the characteristics which the untreated clay exhibited in water; for example, it will swell in many organic liquids and will form stable gels and colloidal dispersions. Such gels are visually homogeneous and often transparent or translucent. They are thermally stable up to the boiling point of the liquid phase and show little tendency to flow or run when heated. The more dilute systems which are more or less liquid have viscosities much higher than those of the liquids themselves, and in most cases exhibit thixotropy characteristic of the analogous bentonite-water system.

The situation is analogous to the above if the element X of the onium compound is other than nitrogen. The onium compound should, however, be such that the resultant onium-bentonite will have substantial swelling properties in organic liquids. Such swelling characteristic may be determined by introducing 2 grams of the onium-bentonite product in 100 milliliters of nitrobenzene and noting the amount of swelling in cubic centimeters. Thus in the case of amine-bentonite products the employment of salts of aliphatic amines, including the propyl, butyl and octylamines containing from 3 to 8 carbon atoms in a straight alaphatic chain will produce an amine-bentonite product showing only a swelling of from 5 to 7 ml. in an excess, for example, in 100 ml. of nitrobenzene. There is, however, generally a distinct region of increase of swelling with amine-bentonites in which the amine has a excess of 10 carbon atoms in a straight aliphatic chain. Thus the swelling in 100 ml. of nitrobenzene of corresponding amine-bentonites are found to be: decylamine-bentonite (10 carbon atoms)—36 ml.; dodecylamine-bentonite (12 carbon atoms)—50 ml.; with this high swelling holding through the series, viz., octadecadienyl-amine-bentonite (18 carbon atoms)—50 ml., a like relation will generally be found for other onium-bentonites. The onium base radical exchanged for the inorganic radical of the clay is moreover hydrophobic as distinguished from hydrophilic, so as to convert the clay from a hydrophilic to an organophilic condition. Such products may, therefore, well be called "high-swelling" onium-bentonites.

The ratio of the onium compound, such as, for example, an amine compound to bentonite, may be varied within certain limits in converting the bentonite to the organophilic condition. In general, it is satisfactory to react the amine salt with the bentonite up to the ratio of 100 milliequivalents of amine salt to 100 grams of bentonite, which is approximately the base-exchange capacity of the standard highly swelling sodium bentonies or even beyond. Typical values of swelling on the above basis are listed below for a series of dodecylammonium-bentonites, in which the ratio of amine to bentonite was varied over wide limits:

| Amine/bentonite: | 50 me./100 g. | 75 | 100 | 125 | 150 | 200 | 300 |
|---|---|---|---|---|---|---|---|
| Swelling in nitrobenzene; ml | | 27.3 | 43.0 | 65.3 | 47.5 | 30.0 | 20.5 | 15.5 |

This table indicates the wide range over which the amine-bentonite ratio can be varied, but it also shows the optimum effect exhibited at the theoretical base-exchange value for this combination.

For the most efficient use of organic base to obtain optimum gelling properties, it is therefore desirable either to select an onium compounds such as an amine compound, which, when converted to the onium base form and reacted by base-exchange with the clay, are absorbed to certain points on the surface of the mineral, or to substitute the proper aliphatic chain in a poly-ammonium base. It has been found that a base with a molecular area of about 70 square angstrom units, for example, a primary amine with a straight aliphatic chain of 10 carbon atoms, e. g., decyl amine, will substantially fulfill the requirements of covering the clay surface. Other types of amines, however, may be used also, e. g., tertiary amines such as lauryl dimethyl amine. An excess of organic matter as occasioned by use of an amine of area greater than 70 Å², as for example octadecenylamine, is not detrimental to the gelling properties of the amine-bentonite composition. Good results, for instance, have been obtained with primary amines having hydrocarbon chains of twelve or more carbon atoms.

The type of clay mineral to be used may vary with the intended use. For optimum gelling properties it is best to use a bentonite which exhibits good gelling properties in water. However, some non-swelling clays when converted to the onium salt form will swell in organic liquids and give rise to the thixotropic colloidal dispersions.

It is to be understood that when reference is made to basic organic onium compounds such as amines, it is implied that before reacting with the clay by base-exchange, the amine is converted to the onium form either by the addition of acid or by reason of the fact that some part of the inorganic base in the naturally occurring clay consists of hydrogen.

In the preparation of organic gels various methods may be followed. If it is desired to prepare a gel free from abrasive impurities it may be advantageous to start with a dilute aqueous dispersion of bentonite and allow the non-bentonite impurities to settle out, or to remove them by super-centrifuging. By the latter method it is also possible to fractionate the clay into any desired particle size fraction. Thereafter, the purified bentonite dispersion is reacted with a salt of the desired amine or other basic organic compound. The flocculated onium bentonite is then filtered out, dried, ground and mixed with a conformable organic liquid which is to be bodied up. For rapidly accomplishing dispersion of the onium bentonite in the organic liquid it is often advantageous to heat the mixture and pass it through a multiple-roll mill such as a paint mill, although this is not necessary for some combinations.

Where impurities associated with the clay are of no consequence, it is often sufficient merely to add the dry clay to the conformable organic liquid containing sufficient amine salt or salts of other basic organic compound to more or less completely react with the clay. The gelling effect is thus enhanced by converting the amine to the salt form, or any of the other basic organic compounds to the onium form, either before or after the addition of the clay, by introduction of an acid such as hydrochloric or acetic acid. Further it is also feasible to prepare a dry mixture, to be used in gel formation, by mixing the amine with dry clay and then mixing in the requisite amount of an acid such as acetic or by mixing the amine sale with the dry clay, thereafter adding the dry amine-bentonite mixture to the conformable organic liquid with which it is desired to produce a gel.

Various examples of modified clays embodying this invention will now be described, and, while in these examples the clay chosen is bentonite because of its comparatively high base-exchange capacity, it will be understood that the invention is applicable to onium-clay reaction products in which the clay is other than bentonite.

Example I 2750 g. of a Wyoming bentonite was dispersed in 70 liters of water and the slurry allowed to stand for two hours to settle out the non-clay impurities. About 10% of the weight of the bentonite was discarded in this process. 150 g. (2.5 mol) of glacial acetic acid was added to 663 g. (2.5 mol) of octadecadienylamine and the amine salt then dissolved in 4 liters of warm water. Flocculation of the bentonite occurred upon addition of the amine salt solution, and the flocculent precipitate was filtered, washed, dried, and pulverized. The resulting bentonite compound thus obtained may be dispersed in various organic liquids to form gels.

Example II 2750 g. of Wyoming bentonite was dispersed in 70 liters of water and the slurry allowed to stand for two hours to settle out the non-clay impurities. 150 g. (2.5 mol) of glacial acetic acid was added to 464 g. (2.5 mol) of dodecylamine and the amine salt then dissolved in 4 liters of warm water. Flocculation of the bentonite occurred upon addition of the amine salt solution, and the precipitate was filtered, washed, dried and pulverized.

Example III

Triphenyl-lauryl phosphonium bromide was prepared by refluxing a mixture of equivalent weights of triphenyl-phosphine and lauryl bromide. After six hours the reaction mixture was cooled and dissolved in alcohol. To a dispersion of 50 g. of Wyoming bentonite in one liter of water was added an alcohol solution of 0.05 mol of the phosphonium base. Upon bringing the pH of the slightly basic dispersion to about 4 with dilute hydrochloric acid, the bentonite complex flocculated, was filtered, washed, dried and ground.

Example IV

One-tenth mol of didodecyl ethyl sulfonium bromide is dispersed in one liter of water, and this is then mixed with agitation with 400 c. c. of a 2½% suspension of Wyoming bentonite. After one hour's standing, it is filtered, dried and ground. The resulting bentonite compound thus obtained may be dispersed in various organic liquids.

Example V

The process of Example IV is carried out except that one-tenth mol of decyl-triphenyl-arsonium halide is used instead of didodecyl ethyl sulfonium bromide.

Example VI

The process of Example IV is carried out except that one-tenth mol of decyl-triphenylstibonium halide is used instead of didodecyl ethyl sulfonium bromide.

Example VII

The process of Example IV is carried out except that one-tenth mol of didodecyl-gamma-pyrone is used instead of didodecyl ethyl sulfonium bromide.

Example VIII

The process of Example IV is carried out except that one-tenth mol of didodecyl ethyltelluronium chloride is used instead of didodecyl ethyl sulfonium bromide.

Each of the above described modified clay products form a gel in an organic liquid and has a substantial gel-forming characteristic therein in the manner heretofore defined. In all of these examples the onium base has a radical which is hydrophobic, has a molecular area of at least 70 square angstrom units, a linear dimension of at least 15 angstrom units, and has at least 10 carbon atoms in a straight chain. The molecular areas in square angstrom units in Example I is at least 121 Å., of Example II is 84 Å., of Example III is 168 Å., of Examples IV and VIII are 167 Å., of Examples V and VI are 155 Å., and of Example VII is 196 Å. The linear dimension in angstrom units of the hydrophobic radical of Example I is 25 A, of Examples II, III, IV and VIII are 17 A, of Examples V and VI are 15 A, and of Example VII is 21 A. The chain lengths are as follows: Example I has 18 carbons, Examples II, III, IV, VII and VIII have each 12 carbon atoms; Examples V and VI have each 10 carbon atoms.

The cation modified clays embodying this invention form gels in various conformable organic liquids and have substantial gel characteristics therein. In addition to nitrobenzene may be enumerated the following: ethyl ether, benzaldehyde, lauryl alcohol, oleic acid, linseed oil, castor oil, methyl salicylate, acetone, tricresyl phosphate, ethyl acetate, butyl phthalate and suitable mineral oils. The organic liquids herein enumerated are defined as "organic conformable liquids," in that they conform to the onium-clays herein specified, because these onium clays form substantial gels in such liquids.

In the case of some of the modified clays embodying this invention, the swelling may not be spontaneous but may be assisted by milling, as in a paint roller mill, an example being lauryl amine bentonite in mineral oils; in some cases the swelling action may be assisted by heat. It is also to be noted that ordinary amines become onium compounds when reacted with acids.

The invention having thus been described, what is claimed is:

1. A cation-modified clay, originally exhibiting a base-exchange capacity of at least 25, in which the exchangeable inorganic cation has been exchanged for an onium base of a class consisting of ammonium, phosphonium, oxonium, sulfonium, arsonium, stibonium and telluronium bases and with a hydrophobic radical having a molecular area of at least 70 square angstrom units, said onium base being of a type capable of and replacing the inorganic cation to an extent sufficient to form with the clay anion an onium-clay swelling to at least 10-fold in nitrobenzene.

2. A cation-modified clay, originally exhibiting a base-exchange capacity of at least 25, in which the exchangeable inorganic cation has been exchanged for an onium base of a class consisting of ammonium, phosphonium, oxonium, sulfonium, arsonium, stibonium and telluronium bases and with a hydrophobic radical having a linear dimension of at least 15 angstrom units, said onium base being of a type capable of and replacing the inorganic cation to an extent sufficient to form with the clay anion an onium-clay swelling to at least 10-fold in nitrobenzene.

3. A cation-modified clay, originally exhibiting a base-exchange capacity of at least 25, in which the exchangeable inorganic cation has been exchanged for an onium base of a class consisting of ammonium, phosphonium, oxonium, sulfonium, arsonium, stibonium and telluronium bases and having an organic radical with at least 10 carbon atoms in a straight chain, said onium base being of a type capable of and replacing the inorganic cation to an extent sufficient to form with the clay anion an organophilic onium-clay.

4. A cation-modified clay, originally exhibiting a base-exchange capacity of about 60–100, in which the exchangeable inorganic cation has been exchanged for an onium base of a class consisting of ammonium, phosphonium, oxonium, sulfonium, arsonium, stibonium and telluronium bases and with a hydrophobic radical having a molecular area of at least 70 square angstrom units, said onium base being of a type capable of and replacing the inorganic cation to an extent sufficient to form with the clay anion an onium-clay swelling to at least 10-fold in nitrobenzene.

5. A cation-modified clay, originally exhibiting a base-exchange capacity of about 60–100, in which the exchangeable inorganic cation has been exchanged for an onium base of a class consisting of ammonium, phosphonium, oxonium, sulfonium, arsonium, stibonium and telluronium bases and with a hydrophobic radical having a linear dimension of at least 15 angstrom units, said onium base being of a type capable of and replacing the inorganic cation to an extent sufficient to form with the clay anion an onium-clay swelling to at least 10-fold in nitrobenzene.

6. A cation-modified bentonite in which the exchangeable inorganic cation has been exchanged for an onium base of a class consisting of ammonium, phosphonium, oxonium, sulfonium, arsonium, stibonium and telluronium bases and with a hydrophobic radical having a molecular area of at least 70 square angstrom units, said onium base being of a type capable of and replacing the inorganic cation to an extent sufficient to form with the clay anion an onium-clay swelling to at least 30-fold in nitrobenzene.

7. A cation-modified bentonite in which the exchangeable inorganic cation has been exchanged for an onium base of a class consisting of ammonium, phosphonium, oxonium, sulfonium, arsonium, stibonium and telluronium bases and having an organic radical with at least 10 carbon atoms in a straight chain, said onium base being of a type capable of and replacing the inorganic cation to an extent sufficient to form with the bentonite anion an organophilic onium-bentonite.

8. A process of cation-modifying a clay originally exhibiting a base-exchange capacity of about 25–100, comprising, reacting such a clay with an onium base of a class consisting of ammonium, phosphonium, oxonium, sulfonium, arsonium, stibonium and telluronium bases and with a hydrophobic radical having a molecular area of at least 70 square angstrom units, in the proportion of at least 50 milliequivalents of the onium base to 100 grams of the clay, in order to form an organophilic onium-clay.

9. A cation-modified clay, originally exhibiting a base-exchange capacity of about 25–100, in which the exchangeable inorganic cation has been exchanged for an onium base of a class consisting of ammonium, phosphonium, oxonium, sulfonium, arsonium, stibonium and telluronium bases and having an organic radical with at least 10 carbon atoms in a straight chain, in the proportion of at least 50 milliequivalents of the onium base to 100 grams of the clay, in order to form an organophilic onium-clay.

10. An organophilic swelling ammonium bentonite having a hydrophobic radical with a molecular area of at least 70 square angstrom units.

11. An organophilic normal alkyl ammonium bentonite having an organic radical with at least 12 carbon atoms in a straight chain.

12. An organophilic octadecyl ammonium bentonite.

13. An organophilic dodecyl ammonium bentonite.

14. An organophilic phosphonium bentonite having a hydrophobic radical with at least 10 carbon atoms in a straight chain.

15. An organophilic sulfonium bentonite having a hydrophobic radical with at least 10 carbon atoms in a straight chain.

16. An organophilic oxonium bentonite having a hydrophobic radical with at least 10 carbon atoms in a straight chain.

ERNST A. HAUSER.

REFERENCES CITED

The following references are of record in the file of this patent:

UNITED STATES PATENTS

| Number | Name | Date |
|---|---|---|
| 1,250,331 | Lloyd | Dec. 18, 1917 |
| 1,799,047 | Jones | Mar. 31, 1931 |
| 1,914,824 | Eberhard | June 20, 1933 |
| 2,033,495 | Taylor et al. | Mar. 10, 1936 |
| 2,033,856 | Smith | Mar. 10, 1936 |
| 2,083,132 | William et al. | June 8, 1937 |
| 2,102,103 | Urbain | Dec. 14, 1937 |
| 2,110,608 | Moore et al. | Mar. 8, 1938 |
| 2,217,926 | Van Campen | Oct. 15, 1940 |
| 2,232,470 | Petke | Feb. 18, 1941 |
| 2,239,974 | Reed | Apr. 29, 1941 |
| 2,248,636 | Marsden | July 8, 1941 |
| 2,334,051 | Wayne | Nov. 9, 1943 |
| 2,366,008 | D'Alelio | Dec. 26, 1944 |
| 2,401,348 | Hauser et al. | June 4, 1946 |

FOREIGN PATENTS

| Number | Country | Date |
|---|---|---|
| 537,766 | Germany | Nov. 6, 1931 |